US010462551B1

(12) United States Patent
Kemmerer et al.

(10) Patent No.: US 10,462,551 B1
(45) Date of Patent: Oct. 29, 2019

(54) WEARABLE AUDIO DEVICE WITH HEAD ON/OFF STATE DETECTION

(71) Applicant: Bose Corporation, Framingham, MA (US)

(72) Inventors: Jeremy Kemmerer, Holliston, MA (US); Christopher A. Barnes, Lynnfield, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/212,040

(22) Filed: Dec. 6, 2018

(51) Int. Cl.
H04R 1/10 (2006.01)
G06F 3/16 (2006.01)
H04R 29/00 (2006.01)

(52) U.S. Cl.
CPC ........... *H04R 1/1041* (2013.01); *G06F 3/165* (2013.01); *H04R 29/001* (2013.01)

(58) Field of Classification Search
CPC ...... H04R 1/1041; H04R 29/001; G06F 3/165
See application file for complete search history.

(56) References Cited

U.S. PATENT DOCUMENTS

| 6,542,436 | B1 | 4/2003 | Myllyla |
| 6,704,428 | B1 | 3/2004 | Wurtz |
| 7,010,332 | B1 | 3/2006 | Irvin et al. |
| 7,406,179 | B2 | 7/2008 | Ryan |
| 7,805,171 | B2 | 9/2010 | Alameh et al. |
| 7,930,007 | B2 | 4/2011 | Andreasson |
| 7,945,297 | B2 | 5/2011 | Philipp |
| 8,006,002 | B2 | 8/2011 | Kalayjian et al. |
| 8,045,727 | B2 | 10/2011 | Philipp |
| 8,098,838 | B2 | 1/2012 | Lee et al. |
| 8,238,567 | B2 | 8/2012 | Burge et al. |
| 8,238,570 | B2 | 8/2012 | Johnson, Jr. et al. |
| 8,238,590 | B2 | 8/2012 | Burge |
| 8,243,946 | B2 | 8/2012 | Burge et al. |
| 8,259,984 | B2 | 9/2012 | van der Bilt |
| 8,315,406 | B2 | 11/2012 | Kon |
| 8,315,876 | B2 | 11/2012 | Reuss |
| 8,335,312 | B2 | 12/2012 | Gerhardt et al. |
| 8,416,961 | B2 | 4/2013 | Lee et al. |
| 8,428,053 | B2 | 4/2013 | Kannappan |
| 8,538,009 | B2 | 9/2013 | Gerhardt et al. |
| 8,559,621 | B2 | 10/2013 | Gerhardt et al. |

(Continued)

FOREIGN PATENT DOCUMENTS

| CN | 102761816 A | 10/2012 |
| CN | 202721822 U | 2/2013 |

(Continued)

*Primary Examiner* — Andrew L Sniezek
(74) *Attorney, Agent, or Firm* — Hoffman Warnick LLC

(57) ABSTRACT

Various implementations include wearable audio devices and related methods for controlling such devices. Some approaches include: detecting a change from an on-head state to an off-head state with a first sensor system; calibrating a second, distinct sensor system after detecting the change from the on-head state to the off-head state; detecting a change from the off-head state to the on-head state using the calibrated second sensor system; and adjusting an operating state of at least one function of the wearable audio device in response to detecting the change from the on-head state to the off-head state or detecting the change from the off-head state to the on-head state.

23 Claims, 4 Drawing Sheets

(56) References Cited

U.S. PATENT DOCUMENTS

| | | |
|---|---|---|
| 8,675,885 B2 | 3/2014 | Sapiejewski |
| 8,699,719 B2 | 4/2014 | Johnson, Jr. et al. |
| 8,705,784 B2 | 4/2014 | Haartsen et al. |
| RE44,980 E | 7/2014 | Sargaison |
| 8,798,042 B2 | 8/2014 | Kannappan |
| 8,805,452 B2 | 8/2014 | Lee |
| 8,831,242 B2 | 9/2014 | Brown et al. |
| 8,842,848 B2 | 9/2014 | Donaldson et al. |
| 8,907,867 B2 | 12/2014 | Wong et al. |
| 8,954,177 B2 | 2/2015 | Sanders |
| 9,094,501 B2 | 7/2015 | Smailagic et al. |
| 9,094,764 B2 | 7/2015 | Rosener |
| 9,117,443 B2 | 8/2015 | Walsh |
| 9,124,970 B2 | 9/2015 | Rabii et al. |
| 9,232,308 B2 | 1/2016 | Murata et al. |
| 9,280,239 B2 | 3/2016 | Rosener |
| 9,286,742 B2 | 3/2016 | Rosener et al. |
| 9,338,540 B2 | 5/2016 | Nicholson |
| 9,344,792 B2 | 5/2016 | Rundle |
| 9,442,523 B2 | 9/2016 | Lee et al. |
| 9,479,860 B2 | 10/2016 | Kwatra et al. |
| 9,486,823 B2 | 11/2016 | Andersen et al. |
| 9,549,055 B2 | 1/2017 | Widell et al. |
| 9,746,491 B2 * | 8/2017 | Perotti .................. G01P 21/00 |
| 9,838,812 B1 | 12/2017 | Shetye et al. |
| 9,860,626 B2 | 1/2018 | Ergezer et al. |
| 9,894,452 B1 | 2/2018 | Termeulen et al. |
| 9,924,255 B2 | 3/2018 | Patel et al. |
| 10,045,111 B1 | 8/2018 | Bonner et al. |
| 2006/0013069 A1 | 1/2006 | Wilson |
| 2018/0146314 A1* | 5/2018 | Rosener ............... H04R 29/004 |
| 2018/0288515 A1* | 10/2018 | Peterson ............. H04R 1/1008 |

FOREIGN PATENT DOCUMENTS

| | | |
|---|---|---|
| CN | 103002373 A | 3/2013 |
| CN | 205071294 U | 3/2016 |
| CN | 205081948 U | 3/2016 |
| EP | 2415276 A1 | 2/2012 |
| EP | 2680608 B1 | 2/2016 |
| JP | 4737496 B2 | 8/2011 |

\* cited by examiner

WEARABLE AUDIO DEVICE WITH HEAD ON/OFF STATE DETECTION

TECHNICAL FIELD

This disclosure generally relates to wearable audio devices. More particularly, the disclosure relates to determining the position of at least one earpiece of a wearable audio device relative to a user, e.g., the ear of a user. Operation of the wearable audio device may be controlled according to the determined position.

BACKGROUND

Conventional approaches for detecting the on/off state of a wearable audio device can be unreliable, resulting in false triggering of don/doff events or failure to detect such events. This false triggering, along with failure to detect don/doff events, can hinder the user experience.

SUMMARY

All examples and features mentioned below can be combined in any technically possible way.

Various implementations include wearable audio devices with on/off state detection. Additional implementations include methods of detecting the on/off state of wearable audio devices to control device functions. A particular approach includes: detecting a change from an on-head state to an off-head state with a first sensor system; calibrating a second, distinct sensor system after detecting the change from the on-head state to the off-head state; detecting a change from the off-head state to the on-head state using the calibrated second sensor system; and adjusting an operating state of at least one function of the wearable audio device in response to detecting the change from the on-head state to the off-head state or detecting the change from the off-head state to the on-head state In some particular aspects, a wearable audio device includes: an acoustic transducer for providing audio playback of an audio signal to a user; an internal microphone acoustically coupled to an ear canal of a user, where the internal microphone generates an electrical signal responsive to an acoustic signal incident at the internal microphone; a proximity sensor; and a control circuit coupled with the acoustic transducer, the internal microphone and the proximity sensor, the control circuit configured to: determine a magnitude of an acoustic transfer function based on the electrical signal and the audio signal at one or more predetermined frequencies to detect a change in the wearable audio device from an on-head state to an off-head state; calibrate the proximity sensor after detecting the change from the on-head state to the off-head state; detect a change in the wearable audio device from the off-head state to the on-head state using the calibrated proximity sensor; and adjust at least one function of the wearable audio device in response to detecting the change from the on-head state to the off-head state or detecting the change from the off-head state to the on-head state.

In other particular aspects, a computer-implemented method of detecting a state of a wearable audio device on a user includes: detecting a change from an on-head state to an off-head state with a first sensor system, where the first sensor system includes an internal microphone acoustically coupled to an ear canal of a user, the internal microphone generates an electrical signal responsive to an acoustical signal incident at the internal microphone, and the detecting of the change from the on-head state to the off-head state includes determining a magnitude of an acoustic transfer function based on the electrical signal and the audio signal at one or more predetermined frequencies; calibrating a second, distinct sensor system after detecting the change from the on-head state to the off-head state; detecting a change from the off-head state to the on-head state using the calibrated second sensor system, where the second sensor system includes a proximity sensor; and adjusting an operating state of at least one function of the wearable audio device in response to detecting the change from the on-head state to the off-head state or detecting the change from the off-head state to the on-head state.

In additional particular aspects, a wearable audio device includes: an acoustic transducer for providing audio playback of an audio signal to a user; an internal microphone acoustically coupled to an ear canal of a user, where the internal microphone generates an electrical signal responsive to an acoustic signal incident at the internal microphone; and a control circuit coupled with the acoustic transducer and the internal microphone, the control circuit configured to: determine a magnitude of an acoustic transfer function based on the electrical signal and the audio signal at one or more predetermined frequencies to detect a change in the wearable audio device from an on-head state to an off-head state; pause the audio signal when the change from the on-head state to the off-head state is detected; output an interrogation signal or narrowband noise at the acoustic transducer while the audio signal is paused; determine a magnitude of an acoustic transfer function based on the electrical signal and the interrogation signal or narrowband noise at one or more predetermined frequencies to detect a change in the wearable audio device from the off-head state to an on-head state; and adjust at least one function of the wearable audio device in response to detecting the change from the on-head state to the off-head state or detecting the change from the off-head state to the on-head state.

Implementations may include one of the following features, or any combination thereof.

In some cases, the control circuit is configured to determine the magnitude of the acoustic transfer function during the audio playback to the user.

In particular aspects, the wearable audio device further includes an external microphone acoustically coupled to an environment external to the wearable audio device, where the external microphone generates an electrical signal responsive to an acoustic signal incident at the external microphone.

In certain implementations, the control circuit is further configured to: measure a first transfer function based upon the audio signal played back at the transducer and a control signal sent to the transducer for initiating the audio playback; measure a second transfer function based upon the audio signal played back at the transducer and the electrical signal generated by the internal microphone; and based on a comparison between the first transfer function and the second transfer function, detect a change in the wearable audio device from an on-head state to an off-head state.

In some aspects, the control circuit is configured to determine the first transfer function and the second transfer function for each of a left side of the wearable audio device and a right side of the wearable audio device, where the change from the on-head state to the off-head state is detected only when both the left side and the right side transfer functions are in agreement.

In particular cases, the proximity sensor includes a capacitive proximity sensor or an infra-red (IR) sensor, and the proximity sensor detects proximity to a head of the user to indicate the change from the off-head state to the on-head state.

In certain implementations, the acoustic transducer is configured to continuously provide the audio playback while the wearable audio device is in the on-head state, where the audio playback includes at least one of: an audible feed or an interrogation signal.

In some aspects, the control circuit is further configured to pause the audio playback in response to detecting the change from the on-head state to the off-head state.

In particular implementations, the predetermined frequencies are below 400 Hz.

In certain cases, the control circuit is further configured to: resume the audio playback in response to the calibrated proximity sensor detecting the change from the off-head state to the on-head state; and re-calibrate the proximity sensor to the off-head state each time the change from the on-head state to the off-head state is detected.

In some implementations, the control circuit includes an active noise reduction (ANR) circuit for generating a feedback noise cancellation signal based on the electrical signal for output by the acoustic transducer.

In particular aspects, the function(s) include an audio playback function, a power function, a capacitive touch interface function, an active noise reduction (ANR) function, a controllable noise cancellation (CNC) function or a shutdown timer function.

In certain cases, the wearable audio device further includes a sensor system coupled with the control circuit for continuously operating during the on-head state, where the control circuit is further configured to: receive an indicator of an off-head detection event from the sensor system; and only in response to receiving the indicator of the off-head detection event, confirm the off-head detection event by using the control circuit to determine a magnitude of an acoustic transfer function based on the electrical signal and the audio signal at one or more predetermined frequencies to detect a change from the on-head state to the off-head state.

In some aspects, the wearable audio device further includes a sensor system coupled with the control circuit, where the control circuit is further configured to: detect the change in the wearable audio device from the on-head state to the off-head state from the determined magnitude of the acoustic transfer function; and confirm the off-head state using the sensor system.

In particular implementations, the method further includes using an active noise reduction (ANR) circuit to generate a feedback noise cancellation signal based on the electrical signal, for output by an acoustic transducer.

In certain cases, the method further includes receiving an indicator of an off-head detection event from an additional sensor system; and initiating the first sensor system to detect a change from the on-head state to the off-head state in response to the indicator of the off-head detection event from the additional sensor system.

In some aspects, the method further includes: continuously providing audio playback to the user while the wearable audio device is in the on-head state, where the audio playback comprises an audible feed or an interrogation signal detectable by the first sensor system; and pausing the audio playback in response to the first sensor system detecting the change from the on-head state to the off-head state.

In particular cases, the method further includes: resuming the audio playback in response to the calibrated second sensor system detecting the change from the off-head state to the on-head state; and re-calibrating the second sensor system to the off-head state each time the change from the on-head state to the off-head state is detected.

In certain implementations, the wearable audio device further includes an external microphone acoustically coupled to an environment external to the wearable audio device, where the external microphone generates an electrical signal responsive to an acoustic signal incident at the external microphone.

In some cases, the method further includes: measuring a first transfer function based upon the audio signal played back at the transducer and a control signal sent to the transducer for initiating the audio playback; measuring a second transfer function based upon the audio signal played back at the transducer and the electrical signal generated by the internal microphone; and based on a comparison between the first transfer function and the second transfer function, detecting a change in the wearable audio device from an on-head state to an off-head state.

In particular aspects, the method further includes determining the first transfer function and the second transfer function for each of a left side of the wearable audio device and a right side of the wearable audio device, where the change from the on-head state to the off-head state is detected only when both the left side and the right side transfer functions are in agreement.

In certain cases, an active noise reduction (ANR) circuit or a controlled noise cancelation (CNC) circuit includes a digital signal processor (DSP) chip for comparing acoustic signals received from a feedforward microphone and acoustic signals received from a feedback microphone to detect the change from the on-head state to the off-head state, where the control circuit is further configured to: awaken the DSP chip from a sleep mode in response to receiving the indicator of the off-head detection event, or provide the audio playback only in response to receiving the indicator of the off-head detection event.

In some aspects the wearable audio device does not have active noise reduction (ANR) capability or has ANR capability disengaged, and the control circuit is configured to estimate the acoustic transfer function at the one or more predetermined frequencies to detect the change in the wearable audio device from the on-head state to the off-head state.

In particular implementations, the magnitude of the acoustic transfer function ($G_{sd}$) based on the electrical signal and the audio signal at one or more predetermined frequencies is calculated using four transfer functions: O→D (T1), O→S (T2), A→D (T3) and A→S (T4), where O is the ambient acoustic signal, A is the audio signal being played, S is the system (feedback) mic, and D is the driver signal, where $G_{sd}$ is calculated by comparing T3 and T4 to determine the off-head state.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
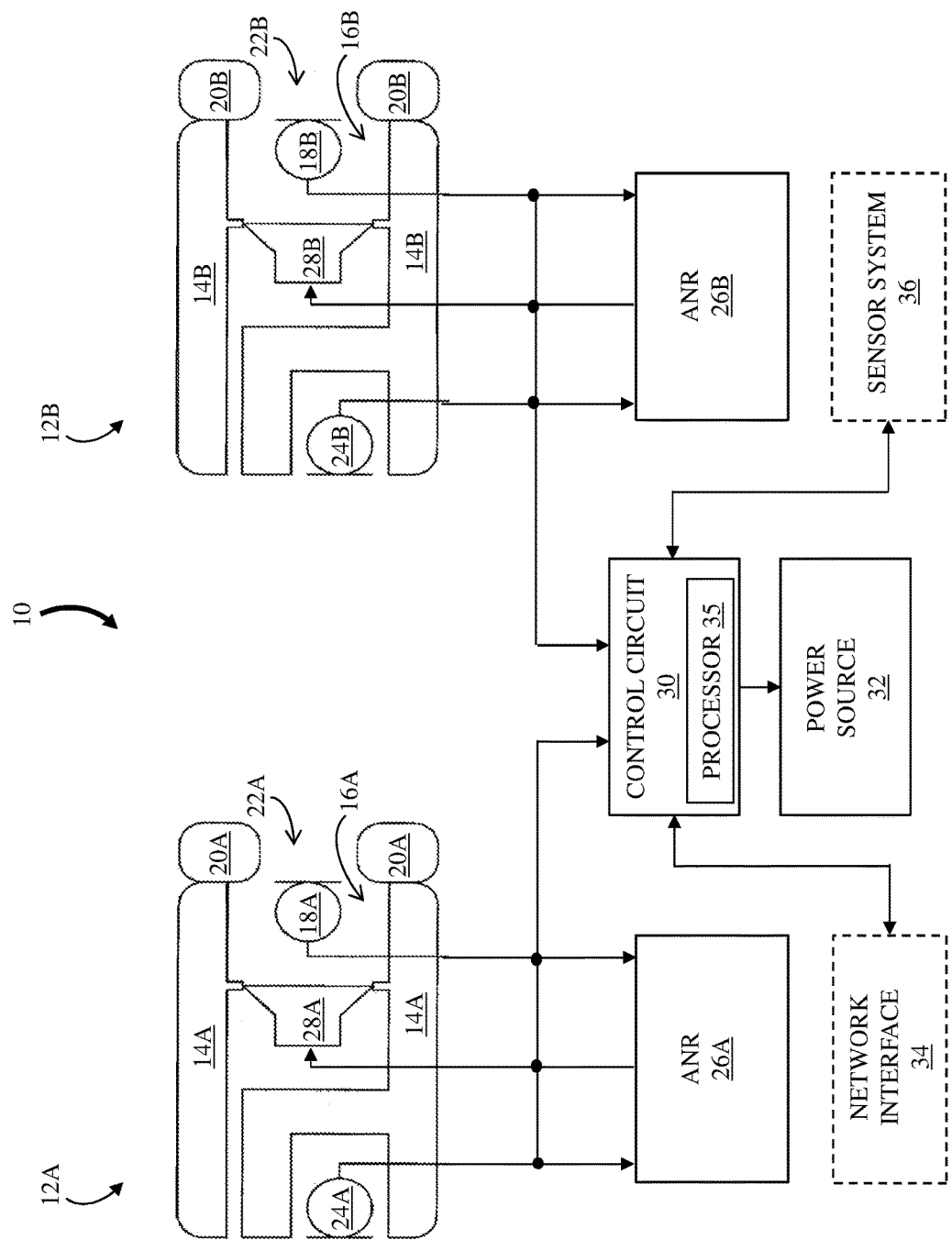
FIG. 1 is a block diagram depicting an example personal audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a control circuit can effectively detect the on/off head state of a user in a wearable audio device to provide for added functionality. For example, a control circuit can be configured to rely upon distinct on-head state detection and off-head state detection mechanisms to effectively detect don/doff events.

Commonly labeled components in the FIGURES are considered to be substantially equivalent components for the purposes of illustration, and redundant discussion of those components is omitted for clarity.

In the examples of a personal audio device and a method of controlling a personal audio device described below, certain terminology is used to better facilitate understanding of the examples. Reference is made to one or more "tones" where a tone means a substantially single frequency signal. The tone may have a bandwidth beyond that of a single frequency, and/or may include a small frequency range that includes the value of the single frequency. For example, a 10 Hz tone may include a signal that has frequency content in a range about 10 Hz.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be acoustically presented with separate earpieces to each ear. Further, developments in digital signal processing (DSP) technology have enabled such provision of audio with various forms of surround sound involving multiple audio channels. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it is commonplace to combine ANR with other audio functions in headphones, headsets, earphones, earbuds and wireless headsets (also known as "earsets"). While the term ANR is used to refer to acoustic output of anti-noise sounds, this term can also include controllable noise canceling (CNC), which permits control of the level of anti-noise output, for example, by a user. In some examples, CNC can permit a user to control the volume of audio output regardless of the ambient acoustic volume.

Aspects and implementations disclosed herein may be applicable to a wide variety of wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed may be particularly applicable to personal (wearable) audio devices such as headphones or other head-mounted audio devices. It should be noted that although specific implementations of personal audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where personal audio device 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR (which may include CNC), the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor 35, including for example, a digital signal processor (DSP) and/or an ARM chip. In some cases, the microcontroller/processor (or simply, processor) 35 can include multiple chipsets for performing distinct functions. For example, the processor 35 can include a DSP chip for performing music and voice related functions, and a co-processor such as an ARM chip (or chipset) for performing sensor related functions.

The control circuit 30 can also include analog to digital converters for converting the inner signals from the two inner microphones 18 and/or the outer signals from the two outer microphones 24 to digital format. In response to the received inner and/or outer microphone signals, the control circuit 30 (including processor 35) can take various actions. For example, audio playback may be initiated, paused or resumed, a notification to a user (e.g., wearer) may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy (BLE), or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller (simply, "processor" 35), which can include decoders, DSP hardware/software, ARM processor hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller (e.g., processor 35). The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In addition to a processor and/or microcontroller, control circuit 30 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling directional audio selection functions according to various particular implementations. It is understood that portions of the control circuit 30 (e.g., instructions) could also be stored in a remote location or in a distributed location, and could be fetched or otherwise obtained by the control circuit 30 (e.g., via any communications protocol described herein) for execution. The instructions may include instructions for controlling device functions based upon detected don/doff events (i.e., the software modules include logic for processing inputs from a sensor system to manage audio functions), as well as digital signal processing and equalization. Additional details may be found in U.S. Patent Application Publication 20140277644, U.S. Patent Application Publication 20170098466, and U.S. Patent Application Publication 20140277639, the disclosures of which are incorporated herein by reference in their entirety.

Personal audio device 10 can also include a sensor system 36 coupled with control circuit 30 for detecting one or more conditions of the environment proximate personal audio device 10. Sensor system 36 can include inner microphones 18 and/or outer microphones 24, sensors for detecting inertial conditions at the personal audio device and/or sensors for detecting conditions of the environment proximate personal audio device 10 as described herein. Sensor system 36 can also include one or more proximity sensors, such as a capacitive proximity sensor or an infra-red (IR) sensor, and/or one or more optical sensors.

The sensors may be on-board the personal audio device 10, or may be remote or otherwise wirelessly (or hard-wired) connected to the personal audio device 10. As described further herein, sensor system 36 can include a plurality of distinct sensor types for detecting proximity information, inertial information, environmental information, or commands at the personal audio device 10. In particular implementations, sensor system 36 can enable detection of user movement, including movement of a user's head or other body part(s). Portions of sensor system 36 may incorporate one or more movement sensors, such as accelerometers, gyroscopes and/or magnetometers and/or a single inertial measurement unit (IMU) having three-dimensional (3D) accelerometers, gyroscopes and a magnetometer.

In various implementations, the sensor system 36 can be located at the personal audio device 10, e.g., where a proximity sensor is physically housed in the personal audio device 10. In some examples, the sensor system 36 is configured to detect a change in the position of the personal audio device 10 relative to the user's head. Data indicating the change in the position of the personal audio device 10 can be used to trigger a command function, such as activating an operating mode of the personal audio device 10, modifying playback of audio at the personal audio device 10, or controlling a power function of the personal audio device 10.

The sensor system 36 can also include one or more interface(s) for receiving commands at the personal audio device 10. For example, sensor system 36 can include an interface permitting a user to initiate functions of the personal audio device 10. In a particular example implementation, the sensor system 36 can include, or be coupled with, a capacitive touch interface for receiving tactile commands on the personal audio device 10.

In other implementations, as illustrated in the phantom depiction in FIG. 1, one or more portions of the sensor system 36 can be located at another device capable of indicating movement and/or inertial information about the user of the personal audio device 10. For example, in some cases, the sensor system 36 can include an IMU physically housed in a hand-held device such as a smart device (e.g., smart phone, tablet, etc.) a pointer, or in another wearable audio device. In particular example implementations, at least one of the sensors in the sensor system 36 can be housed in a wearable audio device distinct from the personal audio device 10, such as where personal audio device 10 includes headphones and an IMU is located in a pair of glasses, a watch or other wearable electronic device.

Methods have been developed for determining the operating state of an earpiece as being on head or off head. Certain methods for determining the operating state for a personal audio device having ANR capability by analyzing the inner and/or outer signals are described, for example, in U.S. Pat. No. 8,238,567, "Personal Acoustic Device Position Determination," U.S. Pat. No. 8,699,719, "Personal Acoustic Device Position Determination," U.S. Pat. No. 9,860,626, "On/Off Head Detection of Personal Acoustic Device," and U.S. Pat. No. 9,838,812, "On/Off Head Detection of Personal Acoustic Device using an Earpiece Microphone", the disclosures of which are incorporated herein by reference in their entirety.

Knowledge of a change in the operating state from on head to off head, or from off head to on head, can be applied for different purposes. For example, features of the personal audio device may be enabled or disabled according to a change of operating state. In a specific example, upon determining that at least one of the earpieces of a personal audio device has been removed from a user's ear to become off head, power supplied to the device may be reduced or terminated. Power control executed in this manner can result in longer durations between charging of one or more batteries used to power the device and can increase battery lifetime. Optionally, a determination that one or more earpieces have been returned to the user's ear can be used to resume or increase the power supplied to the device. In other cases, one or more interfaces can be controlled using knowledge of the on/off head state, e.g., a capacitive touch interface can be disabled when the off-head state is detected. Audio playback can also be controlled using knowledge of the on/off head state, e.g., to pause or resume playback. Noise cancellation/reduction can also be controlled using knowledge of the on/off head state, e.g., to adjust the controllable noise cancellation (CNC) level of the device.

With continuing reference to FIG. 1, in one example implementation, the control circuit 30 is in communication with the inner microphones 18 and receives the two inner signals. Alternatively, the control circuit 30 may be in communication with the outer microphones 24 and receive the two outer signals. In another alternative, the control circuit 30 may be in communication with both the inner microphones 18 and outer microphones 24, and receives the two inner and two outer signals. It should be noted that in some implementations, there may be multiple inner and/or outer microphones in each earpiece 12. As noted herein, the control circuit 30 can include a microcontroller or processor having a DSP and the inner signals from the two inner microphones 18 and/or the outer signals from the two outer microphones 24 are converted to digital format by analog to digital converters. In response to the received inner and/or outer signals, the control circuit 30 can take various actions. For example, the power supplied to the personal audio device 10 may be reduced upon a determination that one or both earpieces 12 are off head. In another example, full power may be returned to the device 10 in response to a determination that at least one earpiece becomes on head. Other aspects of the personal audio device 10 may be modified or controlled in response to determining that a change in the operating state of the earpiece 12 has occurred. For example, ANR functionality may be enabled or disabled, audio playback may be initiated, paused or resumed, a notification to a wearer may be altered, and a device in communication with the personal audio device may be controlled. As illustrated, the control circuit 30 generates a signal that is used to control a power source 32 for the device 10. The control circuit 30 and power source 32 may be in one or both of the earpieces 12 or may be in a separate housing in communication with the earpieces 12.

When an earpiece 12 is positioned on head, the ear coupling 20 engages portions of the ear and/or portions of the user's head adjacent to the ear, and the passage 22 is positioned to face the entrance to the ear canal. As a result, the cavity 16 and the passage 22 are acoustically coupled to the ear canal. At least some degree of acoustic seal is formed between the ear coupling 20 and the portions of the ear and/or the head of the user that the ear coupling 20 engages. This acoustic seal at least partially acoustically isolates the now acoustically coupled cavity 16, passage 22 and ear canal from the environment external to the casing 14 and the user's head. This enables the casing 14, the ear coupling 20 and portions of the ear and/or the user's head to cooperate to provide some degree of PNR. Consequently, sound emitted from external acoustic noise sources is attenuated to at least some degree before reaching the cavity 16, the passage 22 and the ear canal. Sound generated by each speaker 28 propagates within the cavity 16 and passage 22 of the earpiece 12 and the ear canal of the user, and may reflect from surfaces of the casing 14, ear coupling 20 and ear canal. This sound can be sensed by the inner microphone 18. Thus the inner signal is responsive to the sound generated by the speaker 28.

The outer signals generated by the outer microphones 24 may be used in a complementary manner. When the earpiece 12 is positioned on head, the cavity 16 and the passage 22 are at least partially acoustically isolated from the external environment due to the acoustic seal formed between the ear coupling 20 and the portions of the ear and/or the head of the user. Thus, sound emitted from the speakers 28 is attenuated before reaching the outer microphones 24. Consequently, the outer signals are generally substantially non-responsive to the sound generated by the speakers 28 while the earpiece 12 is in an on-head operating state.

When the earpiece 12 is removed from the user so that it is off head and the ear coupling 20 is therefore disengaged from the user's head, the cavity 16 and the passage 22 are acoustically coupled to the environment external to the casing 14. This allows the sound from the speaker 28 to propagate into the external environment. As a result, the transfer function defined by the outer signal of the outer microphone 24 relative to the signal driving the speaker 28 generally differs for the two operating states. More particularly, the magnitude and phase characteristics of the transfer function for the on head operating state are different from the magnitude and phase characteristics of the transfer function for the off-head operating state.

Figure 2:
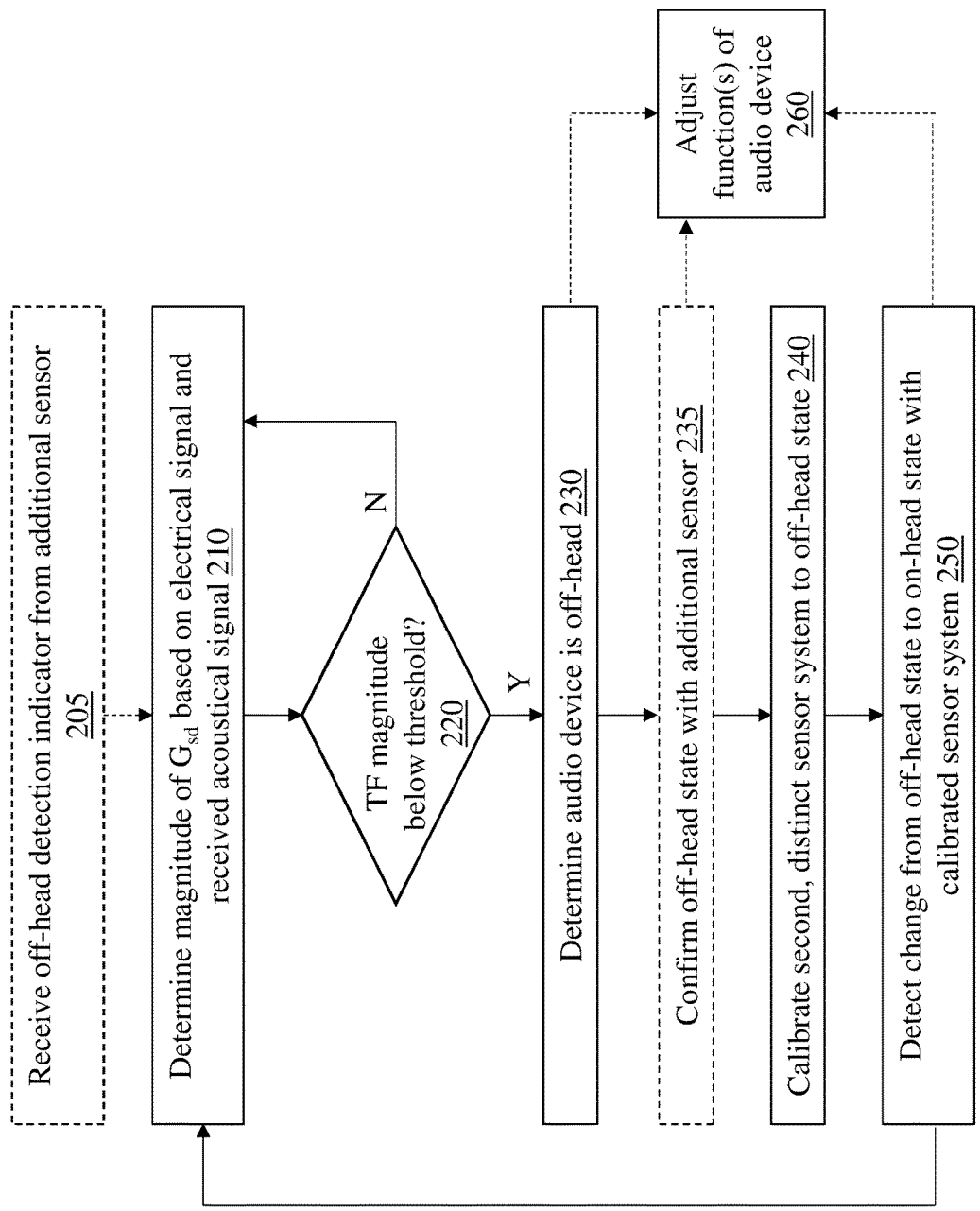
FIG. 2 is a flowchart representation of an example of a method of controlling a personal audio device 10 according to various implementations.

FIG. 2 is a flowchart representation of an example of a method of controlling a personal audio device 10 according to various implementations. Processes described with respect to the method can be performed by one or more components in the personal audio device 10 (FIG. 1), in particular, by the control circuit 30. It is understood that the control circuit 30 can include multiple circuits, or chips, configured to perform particular functions described herein. The control circuit 30 is configured to perform processes to control the personal audio device 10, e.g., to control operations in response to detecting an on-head state and/or off-head state event.

As described herein, the personal audio device 10 includes internal microphones 18 that are acoustically coupled to the user's ear canal when the personal audio device 10 is in the on-head state. Each internal microphone 18 generates an electrical signal responsive to an acoustical signal from the transducer 28 incident at the internal microphone 18. In a first process (process 210), the control circuit 30 determines a magnitude of an acoustic transfer function ($G_{sd}$) based on the electrical signal generated by the internal microphone 18 and the acoustical signal received at the internal microphone 18 at one or more predetermined frequencies, for example frequencies below 400 Hz. That is, as described herein, the control circuit 30 is configured to estimate the "acoustic transfer function ($G_{sd}$)", which is a quantity that is calculated based upon measured transfer function components. In a laboratory setting, this acoustic transfer function ($G_{sd}$) can be measured by computing a transfer function between the driver signal (voltage) and feedback microphone signal (voltage) in the absence of noise or other sound, that is, without ANR functionality running. However, in practice, it is difficult to directly measure the acoustic transfer function ($G_{sd}$) in a wearable audio device because ANR functionality is often employed. As such, the acoustic transfer function ($G_{sd}$) described herein is noted as an estimated function that is based upon other measured transfer function components. This "acoustic transfer function ($G_{sd}$)" differs from measured transfer function values, and is denoted as such herein.

With continuing reference to FIG. 2, if the magnitude of the acoustic transfer function does not exceed a threshold value, the control circuit 30 periodically recalculates the acoustic transfer function, as indicated by the loop in FIG. 2 (No to decision 220). This acoustic transfer function can be continuously calculated, or triggered by an event, e.g., a sensor event such as detection of movement of the personal audio device 10 by a sensor such as an infra-red sensor or capacitive proximity sensor. The threshold value is established using calculations of voltage differentials when the personal audio device 10 is off-head, and on-head, respectively, e.g., between the driver signal and feedback microphone signal(s). When the magnitude of this acoustic transfer function ($G_{sd}$) is below a threshold value (Yes to decision 220), the control circuit 30 determines that the personal audio device 10 has changed from an on-head state to an off-head state (process 230). In this sense, the transducer 28 and the microphone 18 provide a first sensor system for the control circuit 30 to detect the change from the on-head state to the off-head state.

In various implementations, the control circuit 30 is configured to determine the magnitude of the acoustic transfer function ($G_{sd}$) during the audio playback to the user. As described herein, the audio playback can include an audible feed (e.g., music, a podcast, an audible book, etc.), or an interrogation signal (e.g., an audible tone, a marginally audible tone or inaudible tone, which may be at a single frequency) detectable by the first sensor system (e.g., microphone 18). According to some implementations, to aid in detecting the change from on-head state to off-head state, the control circuit 30 continuously provides the audio playback to the user while the personal audio device 10 is determined to be in the on-head state. That is, even when the user is not electively playing audio at the personal audio device 10, the control circuit 30 is configured to output an interrogation signal (e.g., inaudible tone, marginally audible tone, or an audible tone) at the transducer 28 to aid in detecting the change from the on-head state to the off-head state. In some particular implementations, the interrogation signal in the audio playback is output to coincide in frequency with the range of the computed acoustic transfer function ($G_{sd}$).

In particular implementations, determining the magnitude of the acoustic transfer function ($G_{sd}$) to determine the off-head state includes calculating multiple acoustic transfer functions, as measured from signals received and/or sent by the control circuit 30. In a particular example, the control circuit 30 is configured to determine the magnitude of the acoustic transfer function ($G_{sd}$) based upon the electrical signal and the received acoustical signal by:

A) measuring a first transfer function based upon the audio signal played back at the transducer 28 and a control signal sent (from the control circuit 30) to the transducer 28 for initiating the audio playback;

B) measuring a second transfer function based upon the audio signal played back at the transducer 28 and the electrical signal generated by the internal microphone 18; and C) detect the change in the personal audio device 10 from the on-head state to the off-head state based upon a comparison between the first transfer function and the second transfer function. In various implementations, the comparison between the first transfer function and the second transfer function generates a ratio, or a difference (after a log transform). This ratio is an estimate of the acoustic transfer function ($G_{sd}$) value, which can be compared to the ratio of measured transfer functions that constitute the threshold in order to detect the change from on-head to off-head state.

In particular implementations, the control circuit 30 is configured to determine the first acoustic transfer function and the second acoustic transfer function for each of the left side and the right side of the personal audio device 10. In these cases, the control circuit 30 only determines that the audio device has changed from the on-head state to the off-head state when both the left and right side acoustic transfer functions are in agreement, that is, both indicate the change from the on-head state to the off-head state.

The approaches for detecting change from the on-head state to the off-head state can be useful in conserving power resources for the audio device 10. That is, these approaches can rely upon a triggering event from the second sensor system (e.g., proximity sensor or an additional sensor) to initiate the process of determining the magnitude of the acoustic transfer function ($G_{sd}$) and determining an on-head to off-head event. In these cases, the computationally intensive processes of calculating the magnitude of the acoustic transfer function can be initiated only after the second sensor system (or another sensor system) indicates that movement has occurred.

With continuing reference to FIG. 2, the control circuit 30 is further configured, after determining that the audio device 10 has changed state from on head to off head (process 230), to calibrate a second, distinct sensor system to the off-head state (process 240). This second sensor system can be located in sensor system 36, and can be physically located at the personal audio device 10. In some cases, the second sensor system includes a proximity sensor such as a capacitive proximity sensor or an infra-red (IR) sensor. This proximity sensor can be located internal to the casing 14, or can be otherwise directed toward the head or body of the user, and is configured to detect proximity of the personal audio device 10, e.g., the earpiece 12, to an object. In some cases, each earpiece 12 has a proximity sensor to enable independent proximity detection for both sides of the personal audio device 10. However, other implementations of the personal audio device 10 include a proximity sensor proximate only one of the earpieces 12.

As noted herein, the second sensor system can be calibrated in order to detect a change in the personal audio device 10 from the off-head state to the on-head state. In some cases, the control circuit 30 calibrates the second sensor system to account for environmental variations in use and/or distinctions in operating modes and/or capabilities of the personal audio device 10. For example, the second sensor system can be calibrated to recognize separation (or lack of proximity) from the user's head, ear or body when the first sensor system detects that the personal audio device 10 is in the off-head state.

In particular cases, the control circuit 30 performs the calibration by measuring a value of the signal received from the second sensor system when the first sensor system detects that the person audio device 10 is in the off-head state. The control circuit 30 then identifies this signal value as the baseline value. Using this baseline value, the control circuit 30 can dynamically set a threshold for on-head detection, for example, by assigning a threshold to a signal value that is one or more standard deviations above the baseline value (e.g., three or four standard deviations above the baseline). In various implementations, in order to detect the change from off-head to on-head state, the control circuit 30 must receive a subsequent signal from the second sensor system that has a value exceeding the threshold value. In particular cases, this on-head detection threshold can be re-calculated each time that the first sensor system detects that the personal audio device 10 changes from the on-head state to the off-head state (e.g., within a power cycle). However, in cases where the control circuit 30 recognizes that the detected signal value is significantly greater than the established threshold (e.g., one or more additional standard deviations above the baseline as compared with the threshold), the control circuit 30 can be configured to prevent additional calibration, e.g., within that power cycle. That is, where the detected signal value from the second sensor system (indicating the donning event) is significantly greater than the threshold value, the control circuit 30 does not perform additional calibration/calculation for the next detected transition from the on-head state to the off-head state within that power cycle.

Additionally, or alternatively, in cases where the control circuit 30 recognizes that the detected signal value is significantly greater than the established threshold (e.g., one or more additional standard deviations above the baseline as compared with the threshold) and/or the earpiece 12 is determined to have a poor seal on the user's body, the control circuit 30 can be configured to use only the second sensor system to detect changes from on-head to off-head and/or off-head to on-head state(s). As noted herein, there are circumstances where the detected signal value from the second sensor system is significantly higher than the established threshold so as to clearly indicate a change in state, e.g., from off-head to on-head. In additional cases, the margin in the acoustic transfer function ($G_{sd}$) value between the on-head state and the off-head state may be too small (e.g., below a threshold) to reliably indicate a change in state, e.g., from the on-head state to the off-head state. This small margin in the acoustic transfer function ($G_{sd}$) values can indicate that the earpiece 12 has a poor seal on the user's body (e.g., ear, head, etc.), such that a tone or other audio playback will not be effectively detected for the purposes of don/doff detection. In one or both such cases (which are not mutually exclusive), the control circuit 30 can be configured to rely solely on the second sensor system signals to detect on-off head and/or off-on head state changes, e.g., within that power cycle.

The calibrated second sensor system (e.g., proximity sensor) can be used to detect a change in the personal audio device 10 from the off-head state to the on-head state (process 250). In particular cases, the calibrated sensor system can be used to detect that the user has placed the personal audio device 10 back on his/her body, e.g., on his/her ears. Where the calibrated sensor system includes one or more proximity sensors, the proximity sensor(s) can send a signal to the control circuit 30 indicating that one or both earpieces 12 are in contact with, or proximate to, the body of the user. In some cases, the proximity sensor is calibrated to send a proximity signal when detecting an object within a threshold distance. Once the personal audio device 10 is placed within that threshold distance from the user, the proximity sensor sends the proximity sensor signal to the control circuit 30 to indicate a trigger event. In various implementations, this approach can conserve power (e.g., batter power from the power source 32) to extend the life of the personal audio device 10.

In response to determining that the personal audio device 10 has had a state change, either from on-head state to off-head state, or from off-head state to on-head state, in some examples, the control circuit 30 is further configured to adjust at least one function of the personal audio device 10 (process 260). Function adjustments can be user-configurable (i.e., adjustable via a menu interface on an app in communication with the personal audio device 10) and/or programmed into control circuit 30 such that some functions are controlled by on-to-off head detection and a possibly distinct group of functions are controlled by off-to-on head detection. In some cases, the control circuit 30 is configured to adjust functions including one or more of: an audio playback function, a power function, a capacitive touch interface function, an active noise reduction (ANR) function, a controllable noise cancellation (CNC) function or a shutdown timer function.

For example, according to some implementations, the control circuit 30 is configured to pause the audio playback (e.g., user-selected playback, narrowband noise, interrogation signal, etc.) in response to detecting the change from the on-head state to the off-head state. In some implementations, the control circuit 30 is configured to resume the audio playback (e.g., playback, narrowband noise, interrogation signal, etc.) that was previously paused in response to the calibrated proximity sensor detecting the change from the off-head state to the on-head state. Additionally, ANR and CNC functions can be disabled or powered down in response to determining that the personal audio device 10 has changed from on-head to off-head state. In other cases, the control circuit 30 can initiate a shutdown timer in response to detecting the change from the on-head state to the off-head state, e.g., to power down the personal audio device 10 after a threshold period has elapsed. In certain cases, control circuit 30 need not adjust a function of the personal audio device 10 in response to detecting a state change, and can simply log or otherwise store data indicating the state change.

In various implementations, processes 210-250 (as well as process 260), can be run continuously, that is, each time that the user dons/doffs the personal audio device 10. In particular cases, each time the personal audio device 10 changes state from the on-head state to the off-head state, the control circuit 30 is configured to re-calibrate the second sensor system (e.g., proximity sensor). In still further particular cases, the control circuit 10 is configured to re-calibrate the second sensor system each time the control circuit 10 detects an environmental change (e.g., using data from sensor system 36 such as GPS data, temperature or humidity data, weather data, etc.). In additional example cases, this iterative re-calibration process can be performed only for each instance when the personal audio device 10 is used, e.g., only once per power cycle for the personal audio device 10. In these implementations, on-off head state detection can be performed using the first sensor system once per power cycle. In these cases, within a given power cycle, additional on-off head state events can be detected exclusively by the second sensor system (e.g., proximity sensor) once the first sensor system has been calibrated for the user. This process can reduce power and/or processing load for the control circuit 30 relative to re-calibrating the second sensor system each time the on-head to off-head state detection is triggered.

In some cases, with continuing reference to FIG. 1 and FIG. 2, the sensor system 36 can include an additional sensor for continuously operating during the on-head state. This additional sensor can be used to supplement state detection performed by the proximity sensor and the internal microphone 18/transducer 28, described with reference to processes 210-260. The additional sensor can include any sensor configured to detect an event, such as a movement of the personal audio device 10. In one example, the additional sensor includes an IMU. In various implementations, the control circuit 30 is further configured to receive an indicator of an off-head detection event from the additional sensor, which is shown as an optional preliminary process (process 205) in FIG. 2. In some cases, this indicator is a sensor signal that indicates the personal audio device 10 has moved (e.g., in terms of translation, rotation, etc.) a threshold distance or in a manner that corresponds with a change from on-head state to off-head state. In other cases, the additional sensor includes an optical sensor configured to detect movement of the personal audio device 10 and transmit a signal to the control circuit 30 indicating that the personal audio device 10 (e.g., an earpiece 12) has meets or exceeds a state detection threshold.

In particular implementations, the additional sensor can be used as an initial screening sensor to detect the change from the on-head state to the off-head state. In these cases, the control circuit 30 receives the indicator of an off-head detection event from the additional sensor, and in response to receiving that indicator, confirms the off-head detection event by determining a magnitude of the acoustic transfer function ($G_{sd}$) based on the electrical signal and the audio signal at one or more predetermined frequencies. In the case that the magnitude of the acoustic transfer function ($G_{sd}$) meets or exceeds the on-to-off head state detection threshold, the control circuit 30 does not indicate a change in the state from on-head to off-head (No to decision 220). However, if the magnitude of the acoustic transfer function ($G_{sd}$) is below the on-to-off head state detection threshold (Yes to decision 220), the control circuit 30 indicates the change in state from on-head to off-head, and may take additional action such as adjusting function(s) of the personal audio device 10.

In still other implementations, the additional sensor can be used as an on-head to off-head state verification system. In these cases, the additional sensor acts as the second level sensor modality to determine that the personal audio device 10 has changed state from on-head to off-head. With reference to FIG. 2, in these cases, after the control circuit 30 determines that the audio device is off-head (process 230), the additional sensor is used to confirm the off-head state, shown as an optional process (process 235). This confirmation can be performed according to any approach described herein, e.g., using an IMU, optical sensor or other sensor system to detect movement that meets or exceeds a threshold corresponding with an off-head event. In these implementations, the control circuit 30 may only take action (e.g., adjust functions of the audio device, process 260; or indicate/log an off-head event) in response to receiving the confirmation from the additional sensor.

As described herein, in some example implementations, the personal audio device 10 can include one or more ANR circuits 26 (FIG. 1) for performing noise cancelling or noise reduction functions. The ANR circuit 26 can rely upon the external microphone(s) 24 to detect (and ultimately control) an amount of ambient noise that is played back to the user. As noted herein, the external microphone 24 is acoustically coupled to the environment external to the personal audio device 10. In various implementations, this external microphone 24 generates an electrical signal responsive to an acoustic signal (e.g., any ambient acoustic signal) incident at the external microphone 24.

This ANR functionality may provide additional modalities for detecting the on/off state of the personal audio device 10. For example, the ANR circuit 26 can generate a feedback noise cancellation signal based on the electrical signal generated by the internal microphone 18. This feedback noise cancellation signal is output by the transducer 28 to cancel or otherwise reduce ambient noise. In implementations, the ANR circuit 26 (which can include CNC functionality) includes a DSP chip for comparing acoustic signals received from the outer (feedforward) microphone 24 and acoustic signals received from the inner (feedback) microphone 18 to detect the change from the on-head state to the off-head state. In additional cases, as noted herein, the processor 35 includes an audio DSP chip or ARM chip for comparing acoustic signals received from the outer (feedforward) microphone 24 and acoustic signals received from the inner (feedback) microphone 18 to detect the change from the on-head state to the off-head state. In either case, the control circuit 30 is configured to: a) awaken the DSP chip from a sleep mode in response to receiving the indicator of the off-head detection event, or b) provide the audio playback only in response to receiving the indicator of the off-head detection event.

Figure 3:
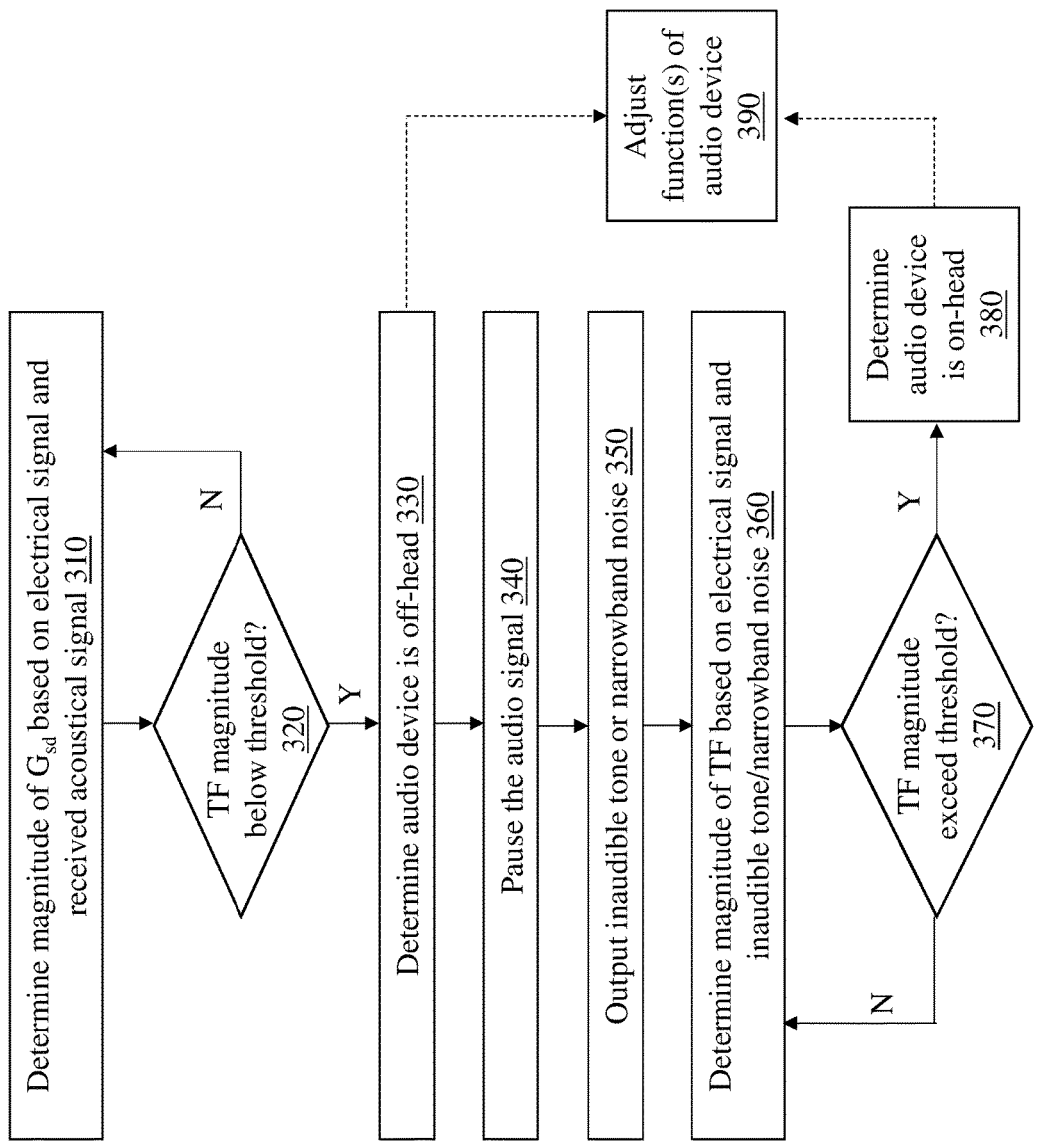
FIG. 3 a flowchart representation of an example of a method of controlling a personal audio device 10 according to various additional implementations.

In still other cases, where the personal audio device 10 does not have ANR functionality, or where ANR functionality is disengaged (e.g., by user command or settings), the control circuit 30 can be configured to estimate the acoustic transfer function (Gsd) at one or more predetermined frequencies to detect the change from on-head to off-head state. In practice, this process can involve calculating or estimating values for one or more acoustic transfer function components to $G_{sd}$. For example, $G_{sd}$ can be calculated according to: O→D (T1); O→S (T2); A→D (T3); and A→S (T4), where O is the ambient acoustic signal detected by an external microphone (e.g., the outer microphone 24 or any external microphone on the personal audio device 10), A is the audio signal output at the transducer 28, S is the system (feedback) microphone 18 signal, and D is the driver signal sent to the transducer 28. In some cases, as noted herein, $G_{sd}$ is calculated by comparing T3 and T4 to determine off-head state. However, in other implementations (e.g., without use of ANR), T4 is calculated and compared with the threshold established by $G_{sd}$ measurements FIG. 3 is a flowchart representation of an example of an additional method of controlling a personal audio device 10 that is playing back audio according to various implementations. In these implementations, the personal audio device 10 may not rely upon sensors from the sensor system 36 to detect the on/off state of the personal audio device 10. That is, the proximity sensor and/or additional sensors described herein may not be employed to detect the on/off state of the personal audio device 10 in these implementations, and instead, playback signals can be used to detect and verify on/off state. FIG. 3 is referred to simultaneously with FIG. 1, and illustrates processes performed by control circuit 30 according to implementations.

The method can include detecting a change from an on-head state to an off-head state for the personal audio device 10 that is playing back audio (e.g., user-selected audio such as music, an audio book, etc.). In various implementations, this process includes determining a magnitude of the acoustic transfer function ($G_{sd}$) based on the electrical signal and the audio signal at one or more predetermined frequencies to detect a change in the personal audio device 10 from an on-head state to an off-head state, as described with respect to processes 210-230 in FIG. 2. These similar processes are shown in FIG. 3 as processes 310-330. In response to detecting the change from on-head state to off-head state, the control circuit 30 pauses the audio signal (process 340), and outputs an interrogation signal or narrowband noise at the transducer 28 (process 350) while the audio signal is paused. While the interrogation signal or narrowband noise is playing, the control circuit 30 then determines a magnitude of an acoustic transfer function based on the electrical signal and the interrogation signal or narrowband noise at one or more predetermined frequencies to detect a change from the off-head state to the on-head state (process 360). As similarly described with respect to processes 220 and 230, the control circuit 30 is configured to compare the acoustic transfer function magnitude with a threshold (as determined by measured transfer function values), and either repeat the calculation of the acoustic transfer function (No to decision 370) or determine that personal audio device 10 has changed state from off-head to on-head (Yes to decision 380). In response to detecting either the change from on-head to off-head and/or off-head to on-head, the control circuit 30 can adjust at least one function of the audio device 10 (process 390), as described herein.

Figure 4:
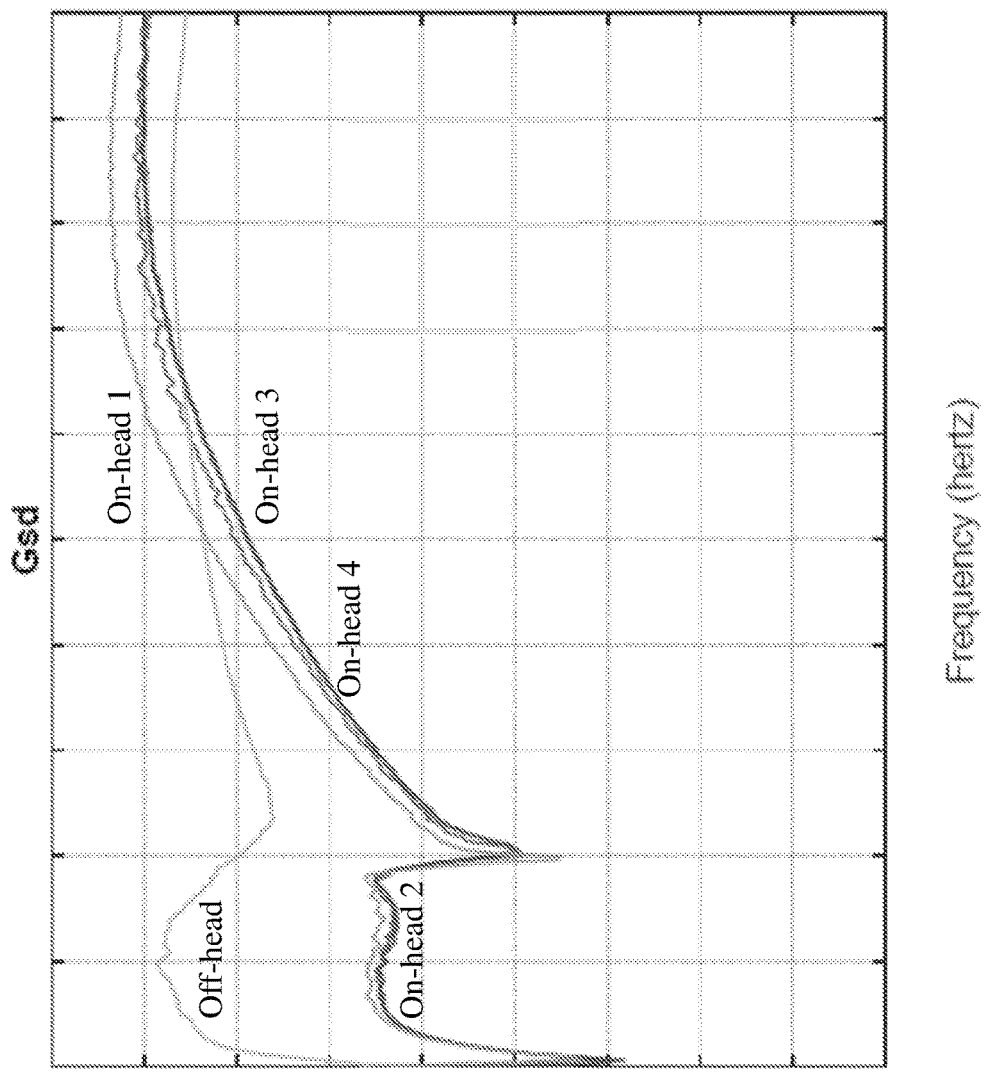
FIG. 4 is an example graphical depiction of a log scale for transfer function ($G_{sd}$) calculation according to various implementations.

FIG. 4 shows an example graphical depiction of $G_{sd}$ calculations for the personal audio device 10. In this example, dbV/V is plotted against frequency (Hertz), and estimates (calculations) of $G_{sd}$ values are plotted for several use scenarios. This depiction illustrates the range of frequencies over which $G_{sd}$ is substantially different in the on-head state as compared with the off-head state, e.g., as shown in the gap between the On-head plot (plot #1) and off-head plots (plots #2-4). The interrogation signal(s) and acoustic transfer function calculations described according to various implementations target this range of frequencies in order to effectively determine don/doff events. That is, in various implementations, the control circuit 30 is programmed to calculate acoustic transfer functions across a range of known frequencies where on-head state and off-head state can be detected.

As noted herein, conventional systems and approaches fail to effectively detect don/doff events in personal audio devices. For example, conventional systems and approaches may compute and make a decision based upon a direct (measured) transfer function between microphone signals, rather than estimating the acoustic transfer function ($G_{sd}$) calculation as described with reference to various implementations. Additionally, these conventional systems and approaches do not use microphone-based approaches to calibrate other sensors to detect don/doff events.

In contrast to conventional systems and approaches noted herein, the audio device 10 disclosed according to various implementations can enable reliable detection of on/off state events. Various approaches employ a dual-sensor approach that verifies a first sensor determination with a second, distinct sensor determination. In additional implementations, verification is performed by estimating acoustic transfer function values as one modality for checking don/doff events. The approaches described herein can aid in reducing power consumption and false triggers that are prevalent in some conventional systems. Additionally, approaches described herein can improve the user experience relative to conventional systems, e.g., by smoothing the transitions from on-state to off-state, and vice versa.

The method(s) described include determining an operating state of the personal audio device 10 based on a characteristic of the acoustic transfer function. By way of an example, the characteristic can be a magnitude of the acoustic transfer function at one or more predetermined frequencies such as the frequency or frequencies of the second electrical signal. Alternatively, the characteristic of the acoustic transfer function may be a power spectrum over a predefined frequency range. For example, the power spectrum characteristic may be useful when the second electrical signal is an audio content signal. Determining the power spectra may include converting the first and second electrical signals into the frequency domain and performing additional processing. In another alternative, the characteristic can be a phase of the acoustic transfer function at one or more predetermined frequencies. In one non-limiting example, a predetermined frequency can be approximately 1.5 KHz corresponding to a significant separation between the phases at that frequency for the on head operating state with respect to the off head operating state.

The method(s) described herein may be applied to both earpieces of a personal audio device. If it is determined that only one of the earpieces changes its operating state, one set of operations of the personal audio device may be changed. In contrast, if it is determined that both earpieces have changed state, a different set of operations may be modified. For example, if it is determined that only one earpiece been changed from an on head to off head operating state, audio playback of the personal acoustic device may be paused. Audio playback may be resumed if it is determined that the earpiece changes back to an on head operating state. In another example, if it is determined that both earpieces have changed from an on head to off head operating state, the personal audio device may be put into a low power state to conserve electrical power. Conversely, if both earpieces are then determined to change to an on head operating state, the personal audio device can be changed to a normal operational power mode.

The particular characteristic of the acoustic transfer function employed in the methods described above, and whether an inner microphone signal, and outer microphone signal, or both are used, may be based on the type of headset. For example, a headset with around-ear earpieces may utilize the method based on the magnitude characteristic of the acoustic transfer function for determining the operating state and an in-ear headset may utilize the method based on the phase characteristic of the acoustic transfer function. In some implementations the method is based on both magnitude and phase characteristics of the acoustic transfer function. Moreover, the method can be used in combination with one or more other methods for determining the operating state of the earpiece or to confirm a determination made by a different method of determining the operating state. For example, the above methods could be used to confirm a determination made from a proximity sensor (e.g., a capacitance sensor) and/or a motion sensor (e.g., accelerometer) sensing that the earpiece is off head.

In various examples described above, a feedback (or internal) and/or feedforward (or external) microphone is used; however, it should be recognized that the microphone(s) do not have to be part of an ANR system and that one or more independent microphones may instead be used.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A wearable audio device comprising:
   an acoustic transducer for providing audio playback of an audio signal to a user;
   an internal microphone acoustically coupled to an ear canal of a user, wherein the internal microphone generates an electrical signal responsive to an acoustic signal incident at the internal microphone;
   a proximity sensor; and
   a control circuit coupled with the acoustic transducer, the internal microphone and the proximity sensor, the control circuit configured to:
   determine a magnitude of an acoustic transfer function based on the electrical signal and the audio signal at one or more predetermined frequencies to detect a change in the wearable audio device from an on-head state to an off-head state;

calibrate the proximity sensor after detecting the change from the on-head state to the off-head state;

detect a change in the wearable audio device from the off-head state to the on-head state using the calibrated proximity sensor; and adjust at least one function of the wearable audio device in response to detecting the change from the on-head state to the off-head state or detecting the change from the off-head state to the on-head state.

2. The wearable audio device of claim 1, wherein the control circuit is configured to determine the magnitude of the acoustic transfer function during the audio playback to the user.

3. The wearable audio device of claim 1, further comprising an external microphone acoustically coupled to an environment external to the wearable audio device, wherein the external microphone generates an electrical signal responsive to an acoustic signal incident at the external microphone.

4. The wearable audio device of claim 1, wherein the control circuit is further configured to:

measure a first transfer function based upon the audio signal played back at the transducer and a control signal sent to the transducer for initiating the audio playback;

measure a second transfer function based upon the audio signal played back at the transducer and the electrical signal generated by the internal microphone; and based on a comparison between the first transfer function and the second transfer function, detect a change in the wearable audio device from an on-head state to an off-head state.

5. The wearable audio device of claim 4, wherein the control circuit is configured to measure the first transfer function and the second transfer function for each of a left side of the wearable audio device and a right side of the wearable audio device, wherein the change from the on-head state to the off-head state is detected only when both the left side and the right side transfer functions are in agreement.

6. The wearable audio device of claim 1, wherein the proximity sensor comprises a capacitive proximity sensor or an infra-red (IR) sensor, and wherein the proximity sensor detects proximity to a head of the user to indicate the change from the off-head state to the on-head state.

7. The wearable audio device of claim 1, wherein the acoustic transducer is configured to continuously provide the audio playback while the wearable audio device is in the on-head state, wherein the audio playback comprises at least one of: an audible feed or an interrogation signal.

8. The wearable audio device of claim 1, wherein the control circuit is further configured to pause the audio playback in response to detecting the change from the on-head state to the off-head state.

9. The wearable audio device of claim 1, wherein the predetermined frequencies are below 400 Hz.

10. The wearable audio device of claim 1, wherein the control circuit is further configured to:

resume the audio playback in response to the calibrated proximity sensor detecting the change from the off-head state to the on-head state; and re-calibrate the proximity sensor to the off-head state each time the change from the on-head state to the off-head state is detected.

11. The wearable audio device of claim 1, wherein the control circuit comprises an active noise reduction (ANR) circuit for generating a feedback noise cancellation signal based on the electrical signal for output by the acoustic transducer.

12. The wearable audio device of claim 1, wherein the at least one function comprises an audio playback function, a power function, a capacitive touch interface function, an active noise reduction (ANR) function, a controllable noise cancellation (CNC) function or a shutdown timer function.

13. The wearable audio device of claim 1, further comprising a sensor system coupled with the control circuit for continuously operating during the on-head state, wherein the control circuit is further configured to:

receive an indicator of an off-head detection event from the sensor system; and only in response to receiving the indicator of the off-head detection event, confirm the off-head detection event by using the control circuit to determine a magnitude of an acoustic transfer function based on the electrical signal and the audio signal at one or more predetermined frequencies to detect a change from the on-head state to the off-head state.

14. The wearable audio device of claim 1, further comprising a sensor system coupled with the control circuit, wherein the control circuit is further configured to:

detect the change in the wearable audio device from the on-head state to the off-head state from the determined magnitude of the acoustic transfer function; and confirm the off-head state using the sensor system.

15. A computer-implemented method of detecting a state of a wearable audio device on a user, the method comprising:

detecting a change from an on-head state to an off-head state with a first sensor system, wherein the first sensor system comprises an internal microphone acoustically coupled to an ear canal of a user, wherein the internal microphone generates an electrical signal responsive to an acoustical signal incident at the internal microphone, the detecting of the change from the on-head state to the off-head state comprising determining a magnitude of an acoustic transfer function based on the electrical signal and the acoustical signal at one or more predetermined frequencies;

calibrating a second, distinct sensor system after detecting the change from the on-head state to the off-head state;

detecting a change from the off-head state to the on-head state using the calibrated second sensor system, wherein the second sensor system comprises a proximity sensor; and adjusting an operating state of at least one function of the wearable audio device in response to detecting the change from the on-head state to the off-head state or detecting the change from the off-head state to the on-head state.

16. The computer-implemented method of claim 15, further comprising, using an active noise reduction (ANR) circuit to generate a feedback noise cancellation signal based on the electrical signal, for output by an acoustic transducer.

17. The computer-implemented method of claim 15, further comprising:

receiving an indicator of an off-head detection event from an additional sensor system; and initiating the first sensor system to detect a change from the on-head state to the off-head state in response to the indicator of the off-head detection event from the additional sensor system.

18. The computer-implemented method of claim 15, further comprising:

continuously providing audio playback to the user while the wearable audio device is in the on-head state, wherein the audio playback comprises an audible feed or an interrogation signal detectable by the first sensor system; and pausing the audio playback in response to the first sensor system detecting the change from the on-head state to the off-head state.

19. The computer-implemented method of claim 15, further comprising:

resuming the audio playback in response to the calibrated second sensor system detecting the change from the off-head state to the on-head state; and re-calibrating the second sensor system to the off-head state each time the change from the on-head state to the off-head state is detected.

20. The computer-implemented method of claim 15, wherein the wearable audio device further comprises an external microphone acoustically coupled to an environment external to the wearable audio device, wherein the external microphone generates an electrical signal responsive to an acoustic signal incident at the external microphone.

21. The computer-implemented method of claim 20, further comprising:

measure a first transfer function based upon the audio signal played back at the transducer and a control signal sent to the transducer for initiating the audio playback;

measure a second transfer function based upon the audio signal played back at the transducer and the electrical signal generated by the internal microphone; and based on a comparison between the first transfer function and the second transfer function, detecting a change in the wearable audio device from an on-head state to an off-head state.

22. The computer-implemented method of claim 21, further comprising measuring the first transfer function and the second transfer function for each of a left side of the wearable audio device and a right side of the wearable audio device, wherein the change from the on-head state to the off-head state is detected only when both the left side and the right side transfer functions are in agreement.

23. A wearable audio device comprising:

an acoustic transducer for providing audio playback of an acoustical signal to a user;

an internal microphone acoustically coupled to an ear canal of a user, wherein the internal microphone generates an electrical signal responsive to an acoustic signal incident at the internal microphone; and a control circuit coupled with the acoustic transducer and the internal microphone, the control circuit configured to:

determine a magnitude of an acoustic transfer function based on the electrical signal and the acoustical signal at one or more predetermined frequencies to detect a change in the wearable audio device from an on-head state to an off-head state;

pause the audio signal when the change from the on-head state to the off-head state is detected;

output an interrogation signal or narrowband noise at the acoustic transducer while the audio signal is paused;

determine a magnitude of an acoustic transfer function based on the electrical signal and the interrogation signal or narrowband noise at one or more predetermined frequencies to detect a change in the wearable audio device from the off-head state to an on-head state; and adjust at least one function of the wearable audio device in response to detecting the change from the on-head state to the off-head state or detecting the change from the off-head state to the on-head state.

* * * * *